United States Patent
Jung et al.

(10) Patent No.: US 8,437,759 B2
(45) Date of Patent: May 7, 2013

(54) METHOD FOR PERFORMING HANDOVER

(75) Inventors: Myung Cheul Jung, Anyang-si (KR); Young Dae Lee, Anyang-si (KR); Sung Jun Park, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 703 days.

(21) Appl. No.: 12/377,590

(22) PCT Filed: Aug. 13, 2007

(86) PCT No.: PCT/KR2007/003873
§ 371 (c)(1),
(2), (4) Date: Feb. 13, 2009

(87) PCT Pub. No.: WO2008/020698
PCT Pub. Date: Feb. 21, 2008

(65) Prior Publication Data
US 2010/0227617 A1    Sep. 9, 2010

(30) Foreign Application Priority Data

Aug. 17, 2006  (KR) ................. 10-2006-0077559

(51) Int. Cl.
*H04W 36/00* (2009.01)
(52) U.S. Cl.
USPC ........... 455/438; 455/436; 370/331; 370/328; 370/338
(58) Field of Classification Search .......... 370/328–338; 455/438, 403, 422.1, 436, 442
See application file for complete search history.

(56) References Cited

U.S. PATENT DOCUMENTS

| 2004/0185852 | A1 | 9/2004 | Son et al. |
| 2005/0030919 | A1* | 2/2005 | Lucidarme et al. ........... 370/328 |
| 2005/0096051 | A1* | 5/2005 | Lee et al. ....................... 455/438 |
| 2005/0186959 | A1* | 8/2005 | Vialen et al. ................ 455/432.1 |
| 2005/0239465 | A1 | 10/2005 | Lee et al. |
| 2006/0172738 | A1 | 8/2006 | Kwon et al. |
| 2006/0291416 | A1* | 12/2006 | Rexhepi et al. ............... 370/331 |
| 2008/0096557 | A1* | 4/2008 | Rinne et al. ................ 455/435.1 |
| 2010/0002630 | A1* | 1/2010 | Park et al. ................... 370/328 |
| 2010/0189071 | A1* | 7/2010 | Kitazoe ........................ 370/331 |
| 2010/0227614 | A1* | 9/2010 | Chun et al. ................... 455/436 |

FOREIGN PATENT DOCUMENTS

| KR | 10-2005-0032285 A | 4/2005 |
| KR | 10-2005-0089627 A | 9/2005 |
| KR | 10-2005-0116497 A | 12/2005 |
| KR | 10-2006-0088072 A | 8/2006 |
| WO | WO-2005-011155 A1 | 2/2005 |

* cited by examiner

*Primary Examiner* — Chuong A Ngo
(74) *Attorney, Agent, or Firm* — McKenna Long & Aldridge LLP

(57) ABSTRACT

A method for enabling a target base station to perform handover of a UE (user equipment) from a source base station to the target base station is provided. The method includes receiving a request for handover of the UE from the source base station, allocating a handover identifier for the UE and transmitting the handover identifier to the source base station. The handover identifier identifies the UE during handover. The UE can use the handover identifier which relatively occupies small amount of radio resources during handover or initial access process.

9 Claims, 4 Drawing Sheets

METHOD FOR PERFORMING HANDOVER

This application is a 35 U.S.C. §371 National Stage Entry of International Application No. PCT/KR2007/003873, filed Aug. 13, 2007, and claims priority to Korean Patent Application No. 10-2006-0077559, filed Aug. 17, 2006 in the Republic of Korea, each of which are hereby incorporated by reference as if fully set forth herein.

TECHNICAL FIELD

The present invention relates to wireless communication, and more particularly, to a method for reducing signaling overhead during handover.

BACKGROUND ART

A third generation partnership project (3GPP) mobile system based on a wideband code division multiple access (WCDMA) radio access technology has been widely deployed all over the world. A high-speed downlink packet access (HSDPA), which is a first step in the evolution of the WCDMA, provides the 3GPP with a radio access technology having high competitiveness. However, since radio access technology has been continuously developed in view of requirements and expectations of users and providers, evolution of a new technology in the 3GPP is required to increase competitiveness. There are required reduced cost per bit, increased service availability, flexible use of a frequency band, a simple structure and an open interface, and adequate power consumption of a user equipment.

In general, a base station serves in a cell. A plurality of user equipments may be located in the cell. There is needed an identifier for distinguishing a user equipment from one another in the cell when the user equipment accesses the base station so as to transmit traffic data. The base station identifies the user equipment using the identifier. Since the number of the identifier is designed in consideration of the maximum number of the user equipments in the cell, the number of, bits to represent the identifier is generally large.

Since it is limited to transmit a large amount of bits during handover or an initial access process, the identifier having large bits may increase signaling overhead.

There is needed a method of reducing the signaling overhead during handover or initial access process.

DISCLOSURE OF INVENTION

Technical Problem

The present invention provides a method for reducing an amount of radio resources which is allocated for a identifier which distinguishes a user equipment from one another when the user equipment initially requests to access a network.

Technical Solution

In one aspect, a method for enabling a target base station to perform handover of a UE (user equipment) from a source base station to the target base station is provided. The method includes receiving a request for handover of the UE from the source base station, allocating a handover identifier for the UE and transmitting the handover identifier to the source base station. The handover identifier identifies the UE during handover.

In another aspect, a method for enabling a UE (user equipment) to perform handover from a source base station to the target base station is provided. The method includes receiving a handover command from the source base station, the handover command comprising a handover identifier which is allocated by the target base station and transmitting an access request to the target base station, the access request comprising the handover identifier, the target base station identifying the UE using the handover identifier.

In still another aspect, a method for requesting an access to a base station in a wireless communication system is provided. The method includes transmitting an access request to the base station, the access request comprising a handover identifier which is allocated by the base station and is received from another base station, the base station utilizing the handover identifier to identify the UE and receiving a response in response to the access request.

Advantageous Effects

A user equipment can use an identifier which relatively occupies small amount of radio resources during handover or initial access process. It is possible to reduce a signaling overhead by minimizing an amount of radio resources allocated to the identifier when the UE initially accesses the network. It is possible to increase the probability of a success of an initial access process by using a previously reserved identifier.

BRIEF DESCRIPTION OF THE DRAWINGS

The above and other features and advantages of the present invention will become more apparent by describing in detail exemplary embodiments thereof with reference to the attached drawings in which.

MODE FOR THE INVENTION

Figure 1:
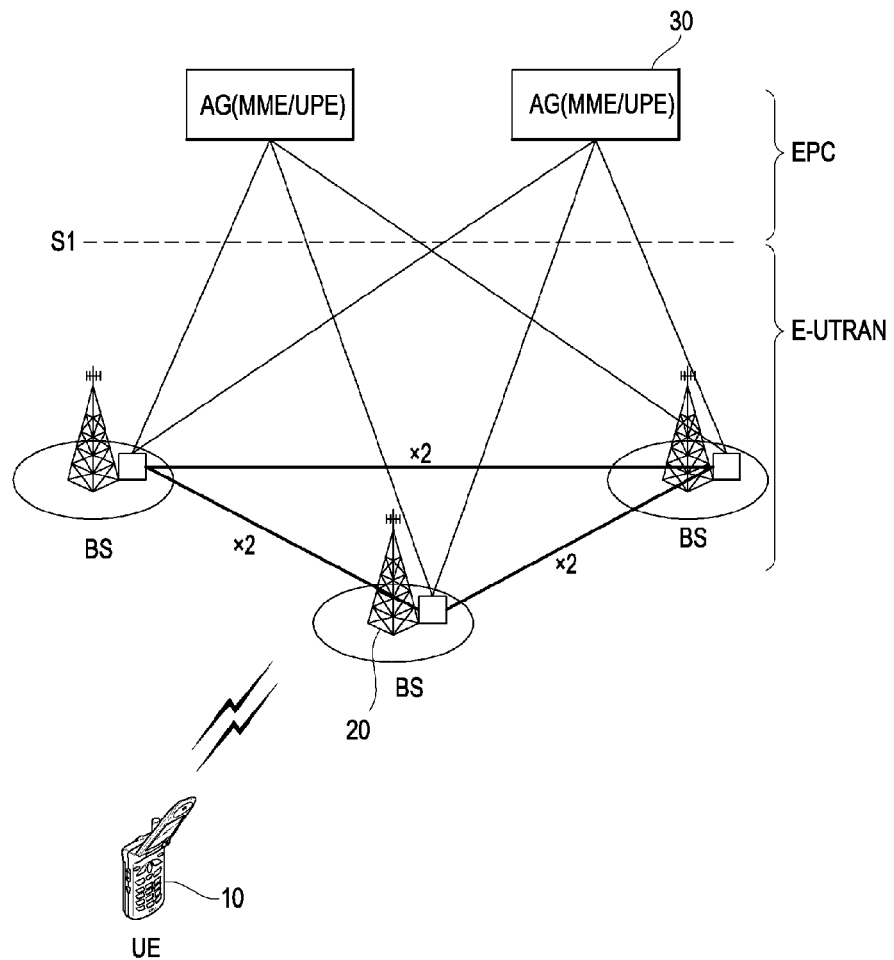
FIG. 1 is a block diagram illustrating a communication system.

Hereinafter, the present invention will be described in detail by explaining exemplary embodiments of the invention with reference to the attached drawings. Like reference numerals in the drawings denote like elements.

FIG. 1 is a block diagram illustrating a wireless communication system. This may be a network structure of an evolved-universal mobile telecommunications system (E-UMTS). The E-UMTS system may be referred to as a long term evolution (LTE) system. The wireless communication system is widely deployed so as to provide various communication services such as voice, packet data and the like.

Referring to FIG. 1, the E-UMTS network includes an evolved UMTS terrestrial radio access network (E-UTRAN) and an evolved packet core (EPC). The E-UTRAN includes a base station (BS) 20 and an access gateway (AG) 30 that are located at ends of a network and connected to an external network. The EPC may include an AG 30, a node for registering a user in a user equipment (UE) 10, and the like.

The UE 10 may be fixed or movable. The UE 10 may be referred to as a mobile station (MS), user terminal (UT), subscriber station (SS) or wireless device.

The BS 20 provides an end-point of a user plane and a control plane to the UE 10. BSs 20 may be connected to one another through an X2 interface. The BSs 20 are interconnected with each other by means of an X2 interface.

The BS 20 generally indicates a fixed station which communicates with the UE 10. The BS 20 may be referred to as an evolved-node B (eNB), base transceiver system (BTS) or access point (AP). At least one cell may exist in the BS 20. An interface for transmitting a user traffic or control traffic may be used among the BSs 20.

The BS 20 may be connected by means of a S1 interface to the EPC (Evolved Packet Core), more specifically to an access gateway (AG) 30. The AG 30 provides an end-point of a session and mobility management function for the UE 10. The S1 interface supports a many-to-many relation between AG 30 and BS 20. The AG 30 may be classified into a part for processing a user traffic and a part for processing a control traffic. The AG for processing the user traffic and the AG for processing the control traffic can communicate with each other by the use of a new interface. The AG 30 may be referred to as a mobility management entity/user plane entity (MME/UPE).

Layers of radio interface protocol between the UE 10 and the network may be classified into a first layer L1, a second layer L2 and a third layer L3 based on three lower-level layers of an open system interconnection (OSI) reference model that is widely known in communication networks. A physical layer belonging to the first layer provides an information transfer service using a physical channel. A radio resource control (RRC) layer belonging to the third layer serves to control radio resources between the UE 10 and the network. The RRC layer of the network and the RRC layer of the UE 10 exchange a RRC message to control the radio resources. The RRC layer of the network may be located at the BS 20.

The radio interface protocol horizontally includes a physical layer, a data link layer and a network layer. The radio interface protocol vertically includes a user plane for transmitting data information and a control plane for transmitting a control signal.

Figure 2:
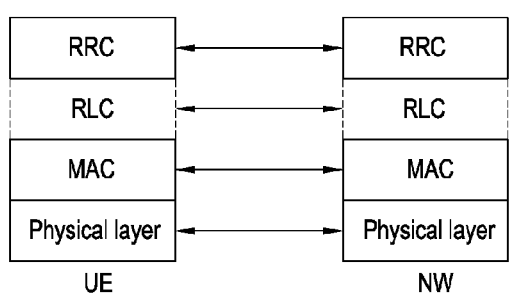
FIG. 2 is a block diagram illustrating a control plane of a radio interface protocol.
Figure 3:
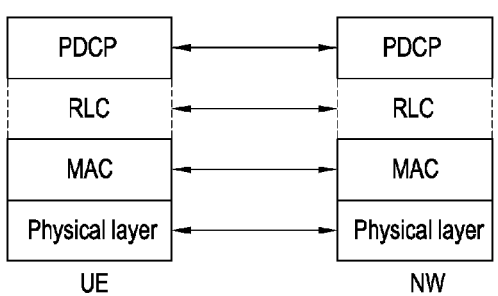
FIG. 3 is a block diagram illustrating a user plane of a radio interface protocol.

FIG. 2 is a block diagram illustrating the control plane of the radio interface protocol. FIG. 3 is a block diagram illustrating the user plane of the radio interface protocol. FIGS. 2 and 3 illustrate the structure of the radio interface protocol between a UE and the E-UTRAN based on a 3GPP radio access network standard.

Referring to FIGS. 2 and 3, the physical layer that is the first level provides an information transfer service to an upper-level layer through a physical channel. The physical layer is connected to a medium access control (MAC) layer, which is an upper-level layer of the physical layer, through a transport channel. Data is transferred between the MAC layer and the physical layer through the transport channel. Data is transferred between different physical layers, that is, a physical layer for a transmitter and a physical layer for a receiver, through the physical channel.

The MAC layer belonging to the L2 layer provides a service to a radio link control (RLC) layer that is an upper-level layer of the MAC layer through a logical channel.

The RLC layer belonging to the L2 layer supports reliable data transmission. It should be noted that the RLC layer is depicted in dotted lines, because if the functions of the RLC layer are implemented in and performed by the MAC layer, the RLC layer itself may not need to exist.

A packet data convergence protocol (PDCP) layer belonging to the L2 layer performs a header compression to reduce the size of an interne protocol (IP) packet header that may include unnecessary control information and has a relatively large size. The header compression makes IP packet, such as an IPv4 packet or an IPv6 packet to be efficiently transmitted through limited radio resource. The PDCP layer may be located at the AG.

The radio resource control (RRC) layer belonging to the L3 layer is defined in only the control plane. The RRC layer serves to control the logical channel, the transport channel and the physical channel in association with configuration, re-configuration and release of a RB. The RB indicates a service provided by the L2 layer for transmitting data between a UE and an E-UTRAN.

A downlink transport channel for transmitting data from the network to the UE includes a broadcast channel (BCH) for transmitting system information and a downlink shared channel (DL-SCH) for transmitting a user traffic or a control message. The user traffic or the control message for a multicast service or a broadcast service may be transmitted through the DL-SCH or an additional downlink-multicast channel (DL-MCH). An uplink transport channel for transmitting data from the UE to the network includes a random access channel (RACH) for transmitting an initial control message and an uplink-shared channel (UL-SCH) for transmitting the user traffic or the control message.

Hereinafter, RRC connection and signaling connection will be described.

In order to start a call, the UE has to be connected to the E-UTRAN through the RRC connection and connected to a core network (CN) through signaling connection. The UE exchanges dedicated control information with the E-UTRAN or CN through the RRC connection or signaling connection.

Figure 4:
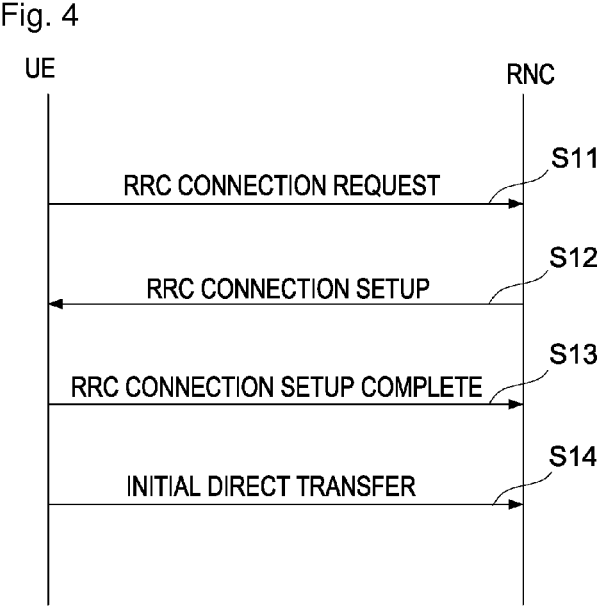
FIG. 4 illustrates an example of a method of transmitting a message between a user equipment (UE) and a radio network controller (RNC)

FIG. 4 illustrates an example of a method of transmitting a message between a UE and a radio network controller (RNC). It shows the transmission of messages which are exchanged between the UE and the RNC for a RRC connection and the transmission of an initial direct transfer (IDT) message for a signaling connection. The RNC serves to control radio resources of an area to which the RNC belongs. The RNC may be included in a BS or an AG.

Referring to FIG. 4, the UE transmits an RRC connection request message to the RNC so as to make the RRC connection (S11). The RNC transmits an RRC connection setup message to the UE in response to the RRC connection request message (S12). The UE transmits an RRC connection setup complete message to the RNC (S13). After the UE transmits an RRC connection setup complete message to the RNC, the UE and the RNC are connected through the RRC connection. After the RRC connection is completed, the UE transmits an IDT message to setup the signaling connection (S14).

Hereinafter, a random access channel (RACH) in a wideband code division multiple access (WCDMA) system will be described.

The RACH is used to transmit short-length data in the uplink direction. An RRC message, such as an RRC connection request message, a cell update message and an URA update message, can be transmitted through the RACH. A URA defines a geographical area composed of one or more cells. A logical channel, such as a common control channel (CCCH), a dedicated control channel (DCCH) and a dedicated traffic channel (DTCH) may be mapped to the RACH. The RACH may be mapped to a physical channel, such as a physical random access channel (PRACH).

Figure 5:
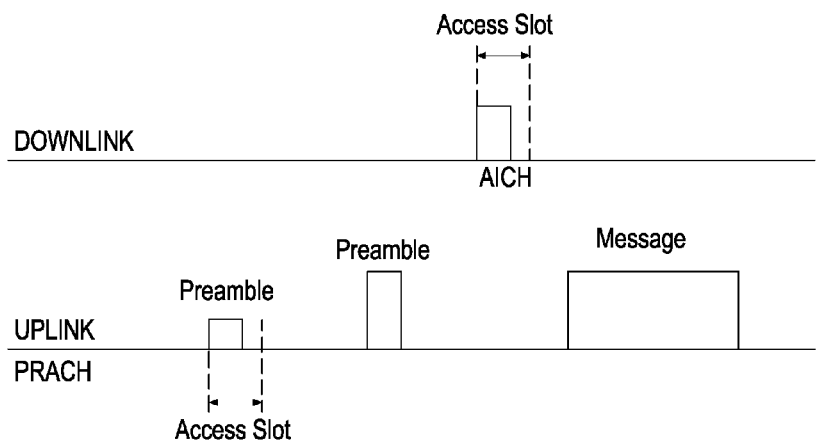
FIG. 5 illustrates an example of a method of transmitting a physical random access channel (PRACH)

FIG. 5 illustrates an example in which the PRACH is used.

Referring to FIG. 5, the PRACH which is uplink physical channel may include a preamble part and a message part. The preamble part performs power ramping function to adjust transport power used to transmit a message and a function to avoid collision between several UEs. The message part transmits a MAC protocol data unit (PDU) which is sent from the MAC layer.

The physical layer of a UE selects an access slot and a signature and transmits the preamble part of the PRACH in the uplink direction, when the MAC layer instructs the physical layer to begin a random access procedure. The signature may be selected from among 16 signatures during a certain initial interval of the access slot. The preamble part which includes the signature may be transmitted during the access slot interval having a length of 1.33 millisecond (ms).

The BS may transmit a response of the preamble part through a downlink physical channel, such as an acquisition indicator channel (AICH). The response transmitted through the AICH include the signature which is transmitted through the PRACH so that the UE which receives the response can distinguish own response by the signature. The response may also include an acknowledgement (ACK) signal or a negative-acknowledgement (NACK) signal.

When the UE receives the ACK signal, the UE transmits a message part with a length 10 ms or 20 ms by using an orthogonal variable spreading factor (OVSF) code corresponding to the signature. When the UE receives the NACK signal, the MAC of the UE instructs the physical layer of the UE to transmit the PRACH again after a suitable time. When the UE does not receive the AICH corresponding to the preamble, the UE transmits a new preamble with a power higher than that of the previous preamble by one step after a predetermined access slot.

Figure 6:
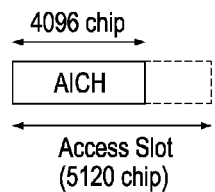
FIG. 6 illustrates an example of a structure of an acquisition indicator channel (AICH) that is a downlink physical channel.

FIG. 6 illustrates an example of a structure of an AICH that is a downlink physical channel.

Referring to FIG. 6, the AICH transmits 16-symbol signature Si (i=0 . . . 15) during an access slot with a length of 5120 chips. The UE transmits a signature Si arbitrarily selected among signatures S0 to S15 during an initial length of 4096 chips. A last length of 1024 chips is set as a transmission power-off section in which any symbol is not transmitted. The preamble part of PRACH can also transmit a signature Si (i=0 . . . 15) with 16 symbols during an initial length of 4096 chips.

In an initial access process, the UE tries to access a network (e.g. a BS) through a random access process. The initial access process may be a process of initially entering the network when the UE is powered on or may be a part of the handover.

The UE transmits measurement information to the BS through a measurement process. The BS can determine whether a handover is performed by receiving the measurement information. When the BS determines that the handover is necessary, the BS prepares the handover. The preparation of the handover may include allocation of radio resources, an admission control, and the like.

Figure 7:
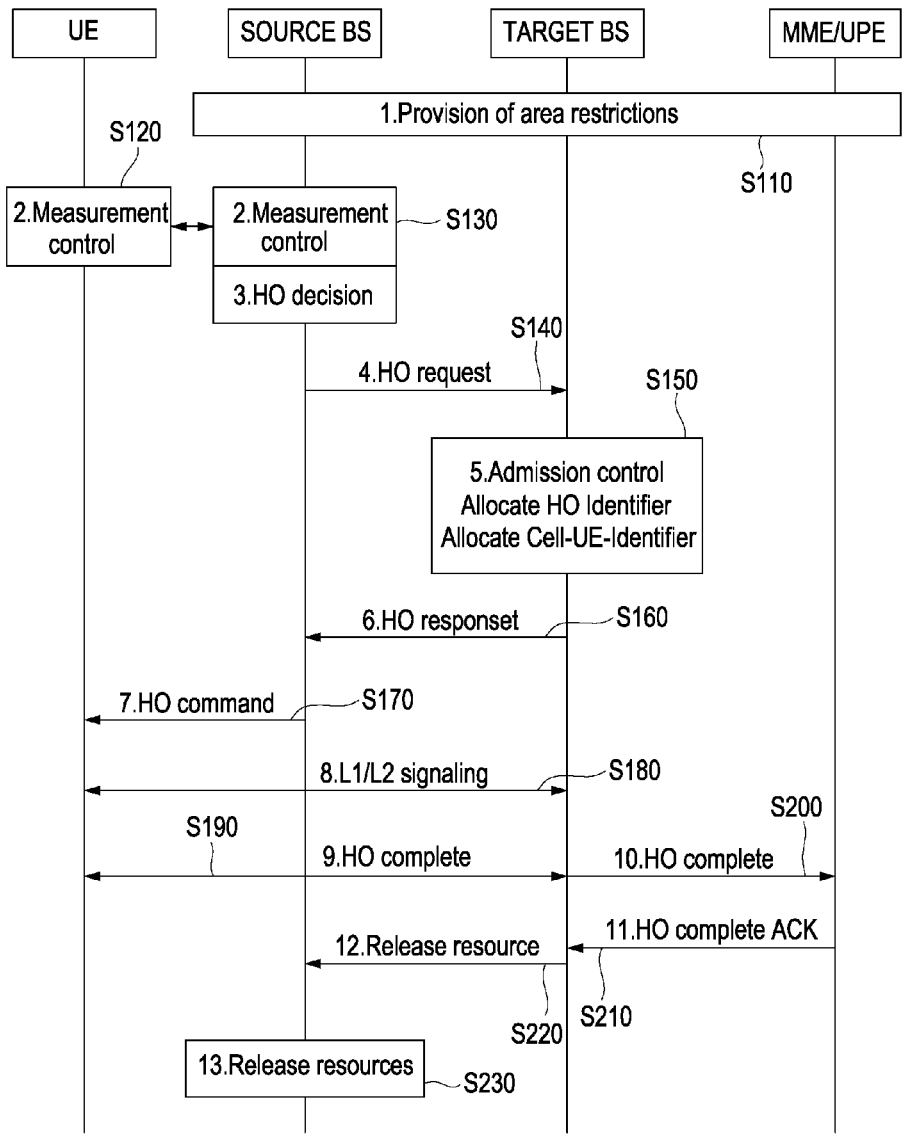
FIG. 7 is a flowchart of method for performing handover according to an embodiment of the present invention.

FIG. 7 is a flowchart of method for performing handover according to an embodiment of the present invention. It shows a handover (HO) process from a first radio network node (a source BS) to a second radio network node (a target BS) while maintaining the connection with the UE, when the UE changes a radio network node that is accessed by the UE into another radio network node. The HO process represents a process of moving from a radio interface served by a BS to another radio interface served by another BS. The HO process may be referred to as a handoff process. The source BS is a BS in which the UE is recently registered. The target BS is a BS in which the UE is to be registered as a result of the HO process.

Referring to FIG. 7, the network prepares area restriction information (S110). A UE context includes the area restriction information.

The UE performs and controls the measurement process set by the source BS (S120). The source BS decides the HO to a neighboring BS (or cell) by receiving measurement information from the UE (S130). The source BS transmits a HO request message to the target BS (S140).

The target BS determines whether to accept the HO request message in consideration of the radio resources of the target BS (S150). The target BS determines whether it is possible to provide a service for the UE such as quality of service (QoS) and determines whether to accept the HO request in accordance with the status of the target BS. When the target BS accepts the HO request, the target BS can reserve radio resources to be used by the UE.

The target BS allocates a cell-UE-identifier. The cell-UE-identifier is unique in the cell served by the target BS. The cell-UE-identifier is allocated to a UE in the cell so as to identify the UE. For example, the cell-UE-identifier may be a cell-radio network temporary identifier (C-RNTI).

The target BS allocates also an HO identifier corresponding to the accepted HO request. The HO identifier may be an identifier for identifying a UE that transmits the HO request. Alternatively, the HO identifier may be used to identify the HO request itself. The HO identifier is allocated during the HO process and used to allow the network to identify the UE during the HO process.

The HO identifier can be generated from the cell-UE-identifier. For example, when the cell-UE-identifier has 16 bits, the HO identifier can use last 8 bits (including LSB (lest significant bits)) of the cell-UE-identifier. Alternatively, the HO identifier may be generated from the cell-UE-identifier by using a mapping rule between the cell-UE-identifier and the HO identifier. The mapping rule, is known to the target BS.

The size of the cell-UE-identifier is determined in accordance with the total number of UEs that are acceptable in a single cell. The number of the UEs which make a request for the handover may be limited. Thus, it is possible to allocate the HO identifier of which the size is considerably less than that of the cell-UE-identifier. Accordingly, it is possible to reduce the signaling overhead during the HO process by using the HO identifier since the number of bits of the HO identifier is lower than that of bits of the cell-UE-identifier.

The target BS transmits a HO response message to the source BS (S160). The HO response message may include information on an HO identifier that is allocated in response to the HO request, information on allocation of resources and a cell-UE-identifier for the UE that is to perform the handover.

The source BS that receives the HO response transmits an HO command message to the UE (S170). The HO command message may include the HO identifier and information on allocation of resources.

The UE that receives the HO command message performs a signaling process for connecting the target BS with first and second layers (S180). The signaling process includes a synchronization process. The signaling process includes an initial connection process between the target BS and the UE. The UE transmits an access request to the target BS by using the HO identifier. This can prevent an access delay caused by colliding with another UE by using the HO identifier.

The UE can identify itself by using the HO identifier when the UE makes a request for an access to the target BS. Alternatively, when the UE knows the mapping rule between the HO identifier and the cell-UE-identifier, the UE can construct the cell-UE-identifier from the HO identifier. The UE can make a request for an access to the target BS by using the cell-UE-identifier.

The UE which completes the access to the first and second layers transmits an HO complete message to the target BS (S190). The target BS transmits the HO complete message to an MME/UPE (S200). The MME/UPE transmits an HO complete ACK message to the target BS (S210). The target BS transmits a resource release message to the source BS (S220). The source BS which receives the resource release message releases all the radio resources of the UE (S230).

The source BS transmits the HO command message to the UE and starts to transmit a downlink user traffic block to the target BS. The user traffic block may be a traffic block transmitted from the PDCP layer of the AG or a traffic block obtained by adding a sequence number to a traffic block received by the RLC of the BS. The target BS can transmit whole traffic blocks to the target BS in the order from a minimum traffic block that is transmitted to the UE but is not checked by the UE.

The target BS allocates the HO identifier so that the UE receives the HO identifier with the optimized size for distinguishing UEs from one another when the UE tries to access the target BS initially so as to perform a handover to the target BS. Accordingly, it is possible to access the target BS by using restricted radio resources. In addition, it is possible to reduce a delay during initial access process by using a previously determined HO identifier.

The HO identifier allocated by the target BS may be defined in various manners.

In an embodiment, a HO identifier may be generated from the cell-UE-identifier. The HO identifier may be constructed so as to have bits of which number is less than that of the cell-UE-identifier.

In another embodiment, a HO identifier may be an HO index. The HO index is an expected HO instance when the target BS admits the HO request and transmits the HO response. The target BS which receives the HO request message may sequentially allocate an index number to the admitted handovers. The index number may be the HO index. The HO index has a fixed size or variable size. The source BS confirms the HO index and transmits the HO index to the UE as the HO identifier. Accordingly, the UE can receive the HO index which is unique to the cell which is served by the target BS.

In still another embodiment, a HO identifier may be random ID (identifier) information. The random ID information may be an identifier that is initially allocated so as to perform a random access process so that the UE accesses a new cell. Alternatively, the random ID information may be information for generating the identifier. For example, the UE transmits the random ID information to the BS so as to identify the UE, when the UE initially accesses the cell or accesses a new cell. The BS transmits information on allocation of radi resources for uplink transmission to the UE through the random ID information. The target BS allocates the random ID information after receiving the HO request message. The random ID information is allocated only to a single UE. Two UEs cannot share the same random ID information at the same time. The UE can transmit an access request to the BS by using the random ID information so as to perform the handover. Since the random ID information is determined from a negotiation with the target BS as a unique value, it is possible to reduce a probability of colliding with another UE. The random ID information may be transmitted to the target BS after being generated in the source BS.

In still another embodiment, a HO identifier may include random ID information and a HO index. When a plurality of UEs share same random ID information in the target BS, the HO identifier including the random ID information and the HO index may be used.

In still another embodiment, a HO identifier may be signature information.

A target BS may allocate a HO identifier. Alternatively, the HO identifier may be generated by a source BS. The HO identifier generated by the source BS may be transmitted to the target BS.

Figure 8:
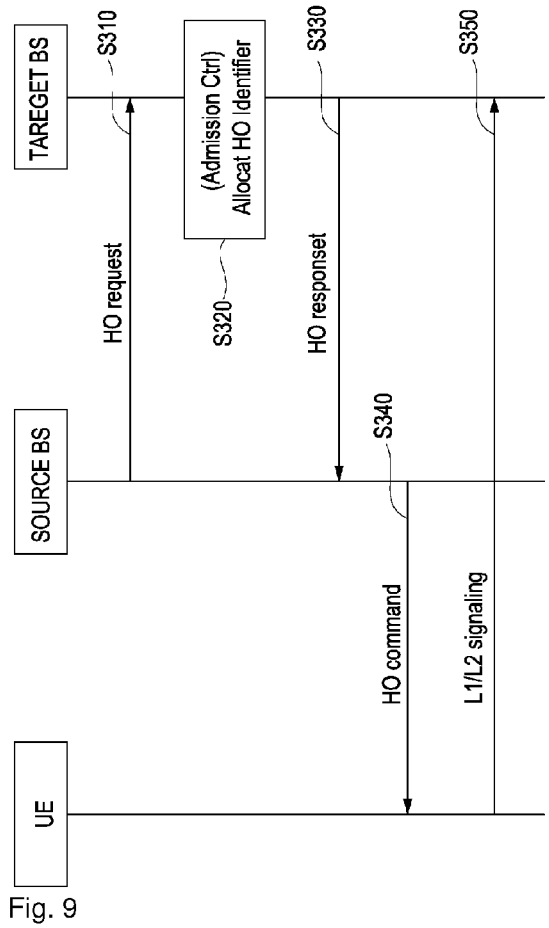
FIG. 8 is a flowchart illustrating method for performing handover using an HO identifier according to an embodiment of the present invention.

FIG. 8 is a flowchart illustrating method for performing handover using an HO identifier according to an embodiment of the present invention.

Referring to FIG. 8, a source BS determines a UE to perform handover to a target BS from the measurement information of the UE. The source BS transmits a HO request message to the target BS (S310).

The target BS determines whether to accept or deny the HO request through admission control after receiving the HO request message and allocates a HO identifier to the accepted HO request (S320). The HO identifier may be an HO index, random ID information, and/or signature information.

A cell-UE-identifier may also be allocated along with the HO identifier. The HO identifier may be generated from the cell-UE-identifier. Radio resources to be used by the UE may be allocated during or after the handover. Radio resource allocation information may be transmitted to the UE. The HO identifier, the cell-UE-identifier and the radio resource allocation information may be associated with one another. The HO identifier, the cell-UE-identifier and the resource allocation information may be managed by the target BS.

The target BS transmits a HO response message to the source BS after accepting the handover (S330). The HO response message may include the HO identifier.

The target BS transmits a HO command message to the UE (S340). The HO command message may include the HO identifier.

The UE performs signaling for L1/L2 connection so as to access the target BS (S350). The random access process is performed. The HO identifier is used in the target BS so as to distinguish the UE from one another.

Figure 9:
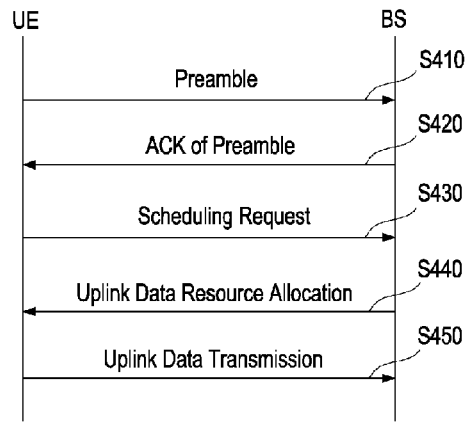
FIG. 9 is a flowchart of a random access process according to an embodiment of the present invention.

FIG. 9 is a flowchart of a random access process according to an embodiment of the present invention. In the random access process, a UE initially makes a request for an access to a BS. In the random access process, uplink radio resources are allocated to the UE for uplink transmission.

Referring to FIG. 9, the UE makes a request for an access to the BS by transmitting a preamble over a RACH to the BS so as to begin the random access process (S410). When the random access process is caused by the handover, a HO identifier may be used to identify the UE which requests the random access process. The HO identifier may be an HO index, random ID information, or signature information. Since the HO identifier is a unique in the cell, it is possible to prevent collision between UEs.

The HO identifier may include the HO index and the random ID information. A part of the random ID information may be used as the HO index. Or the random ID information may be used by referring to information related to the HO index. Even when the random ID information may not be maintained as a unique value for distinguishing the UE during the handover process, the HO index itself may be maintained as a unique value. When the HO index and the random ID information is used at the same time, as a result, a unique identifier is allocated. It is possible to prevent collision.

The BS transmits an ACK message for the preamble to the UE in response to the preamble (S420). The ACK message includes timing information and uplink radio resource allocation information.

The UE transmits a scheduling request message to the BS (S430). The UE requests the BS to perform scheduling by using the timing information and the uplink radio resource allocation information which are included in the ACK message. The UE may transmit the scheduling request message over a uplink SCH. The BS can distinguish the UE from one another by using the HO identifier. Since the HO identifier is a unique in the cell, it is possible to prevent collision.

The HO identifier may include the HO index and the random ID information. Alternatively, when only the random ID information is used as the HO identifier, the HO index may be included in the random ID information or referred to by the random ID information.

The HO identifier may include at least one of the HO index, the random ID information, the signature information and random ID information which includes the HO index or refers to information related to the HO index value.

The BS allocates uplink radio resources (S440). The UE transmits uplink data through the uplink radio resources (S450).

When the UE transmits a message through an uplink, such as when the UE transmits the preamble to the BS, requests the BS to perform uplink scheduling, or transmits uplink data, the HO identifier may be used to identify the UE. If the HO identifier is previously allocated during handover, the BS can identify the UE by using only the HO identifier.

During preparing the handover, it is possible to receive information on the cell-UE-identifier to be used by the UE. In the signaling process after completing HO process, it is possible to identify the UE by using the cell-UE-identifier. The size of the cell-UE-identifier is generally greater than that of the HO identifier. Accordingly, when the HO identifier is used instead of the cell-UE-identifier during HO, it is possible to identify the UE by using information with less size.

Figure 10:
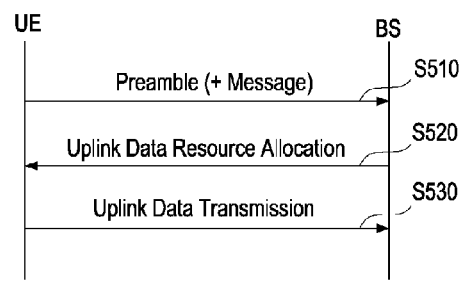
FIG. 10 is a flowchart of a random access process according to another embodiment of the present invention.

FIG. 10 is a flowchart of a random access process according to another embodiment of the present invention.

Referring to FIG. 10, a UE transmits a preamble to a BS so as to request for allocating uplink radio resources (S510). The UE may transmit the preamble including message part. The BS can identify the UE by using a HO identifier included in the message part.

The BS transmits timing adjustment information and uplink radio resource allocation information to the UE (S520). The UE transmits uplink data by using the timing adjustment information and the uplink data resource allocation information (S530). The BS can identify the UE by using the HO identifier.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for enabling a target base station to perform handover of a UE (user equipment) from a source base station to the target base station, the method comprising:
   receiving, by the target base station which directly communicates with the UE, a request for handover of the UE directly from the source base station which directly communicates with the UE;
   generating, by the target base station, a handover identifier for the UE from a cell-UE-identifier, wherein the handover identifier identifies the UE during handover, the cell-UE-identifier uniquely identifies the UE in a cell which is served by the target base station, and the number of bits of the handover identifier is smaller than the number of bits of the cell-UE-identifier; and
   transmitting, by the target base station, the handover identifier directly to the source base station.

2. The method of claim 1, wherein a portion of the cell-UE-identifier is identical to the handover identifier.

3. The method of claim 2, wherein the cell-UE-identifier comprises a C-RNTI (Cell-Radio Network Temporary Identifier).

4. The method of claim 1, wherein the handover identifier includes least significant bits (LSBs) of the cell-UE-identifier.

5. The method of claim 1, wherein the handover identifier is generated from signature information.

6. The method of claim 1, further comprising receiving, by the target base station, a cell-UE-identifier from the UE after the handover identifier is delivered from the source base station to the UE, wherein the cell-UE-identifier is converted by the UE from the handover identifier.

7. The method of claim 1, further comprising receiving, by the target base station, the handover identifier from the UE after the handover identifier is delivered from the source base station to the UE.

8. The method of claim 1, wherein the handover identifier is a handover index, the handover index identifying the request for handover of the UE in the cell which is served by the target base station.

9. A target base station performing handover of a user equipment (UE) from a source base station, the target base station comprising:
   a processor configured for:
   receiving, by the target base station which directly communicates with the UE, a request for handover of the UE directly from the source base station which directly communicates with the UE;
   generating, by the target base station, a handover identifier for the UE from a cell-UE-identifier, wherein the handover identifier identifies the UE during handover, the cell-UE-identifier uniquely identifies the UE in a cell which is served by the target base station, and the number of bits of the handover identifier is smaller than the number of bits of the cell-UE-identifier; and
transmitting, by the target base station, the handover identifier directly to the source base station.

* * * * *